(12) United States Patent
Chin et al.

(10) Patent No.: US 9,738,958 B2
(45) Date of Patent: Aug. 22, 2017

(54) AUSTENITIC, LIGHTWEIGHT, HIGH-STRENGTH STEEL SHEET HAVING HIGH YIELD RATIO AND DUCTILITY, AND METHOD FOR PRODUCING THE SAME

(75) Inventors: Kwang-Geun Chin, Gwangyang-si (KR); Sang-Ho Han, Gwangyang-si (KR); Jai-Hyun Kwak, Gwangyang-si (KR)

(73) Assignee: POSCO, Pohang-si (KR)

( * ) Notice: Subject to any disclaimer, the term of this patent is extended or adjusted under 35 U.S.C. 154(b) by 707 days.

(21) Appl. No.: 13/993,452

(22) PCT Filed: Dec. 12, 2011

(86) PCT No.: PCT/KR2011/009537
§ 371 (c)(1),
(2), (4) Date: Jun. 12, 2013

(87) PCT Pub. No.: WO2012/081871
PCT Pub. Date: Jun. 21, 2012

(65) Prior Publication Data
US 2013/0295409 A1    Nov. 7, 2013

(30) Foreign Application Priority Data
Dec. 13, 2010  (KR) .................. 10-2010-0126603

(51) Int. Cl.
| | | |
|---|---|---|
| *C22C 38/04* | (2006.01) | |
| *C22C 38/58* | (2006.01) | |
| *C21D 8/02* | (2006.01) | |
| *C22C 38/00* | (2006.01) | |
| *C22C 38/02* | (2006.01) | |
| *C22C 38/06* | (2006.01) | |
| *C22C 38/14* | (2006.01) | |
| *C23C 30/00* | (2006.01) | |
| *C23C 2/02* | (2006.01) | |
| *C23C 2/28* | (2006.01) | |
| *B21D 17/04* | (2006.01) | |
| *B32B 15/01* | (2006.01) | |
| *C22C 38/12* | (2006.01) | |
| *C22C 38/20* | (2006.01) | |
| *C22C 38/28* | (2006.01) | |
| *C22C 38/38* | (2006.01) | |
| *C22C 38/44* | (2006.01) | |
| *C22C 38/48* | (2006.01) | |
| *C22C 38/50* | (2006.01) | |
| *C22C 38/54* | (2006.01) | |

(52) U.S. Cl.
CPC .............. *C22C 38/58* (2013.01); *B21D 17/04* (2013.01); *B32B 15/01* (2013.01); *B32B 15/012* (2013.01); *C21D 8/02* (2013.01); *C21D 8/0205* (2013.01); *C21D 8/0247* (2013.01); *C21D 8/0273* (2013.01); *C21D 8/0284* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C22C 38/20* (2013.01); *C22C 38/28* (2013.01); *C22C 38/38* (2013.01); *C22C 38/44* (2013.01); *C22C 38/48* (2013.01); *C22C 38/50* (2013.01); *C22C 38/54* (2013.01); *C23C 2/02* (2013.01); *C23C 2/28* (2013.01); *C23C 30/00* (2013.01); *C21D 2211/001* (2013.01); *Y10T 428/12757* (2015.01); *Y10T 428/12799* (2015.01)

(58) Field of Classification Search
CPC ......... C22C 38/04; C22C 38/06; C22C 38/38; C22C 38/58; C21D 2211/001
USPC ............................ 420/72–81; 148/329, 337
See application file for complete search history.

(56) References Cited

U.S. PATENT DOCUMENTS

| | | | |
|---|---|---|---|
| 5,431,753 A | 7/1995 | Kim et al. | |
| 5,647,922 A * | 7/1997 | Kim ....................... | C22C 38/04 148/530 |
| 6,358,338 B1 * | 3/2002 | Guelton ............... | C21D 8/0205 148/547 |

(Continued)

FOREIGN PATENT DOCUMENTS

| | | |
|---|---|---|
| DE | 19900199 A1 | 7/2000 |
| EP | 0889144 A1 | 1/1999 |

(Continued)

OTHER PUBLICATIONS

B.W. Busch, T. Gustafsson, H. Viefhaus, C. Uebing, "Medium-energy ion scattering study of arsenic and sulfur segregation to the Fe-9% W (100) surface," Surface Science, 463, 2000, pp. 145-155.*
"Glossary of Metallurgical and Metalworking Terms," Metals Handbook, ASM International, 2002, term(s): austenite, steel.*

(Continued)

*Primary Examiner* — Scott Kastler
*Assistant Examiner* — Vanessa Luk
(74) *Attorney, Agent, or Firm* — The Webb Law Firm

(57) ABSTRACT

Provided is an austenitic, lightweight, high-strength steel sheet having a high yield ratio and ductility and a method for producing the same, and more particularly, to a high-strength steel sheet for automotive interior panels, exterior panels, and structural parts, and a method for producing the steel sheet. The steel sheet may be a hot-rolled steel sheet, a cold-rolled steel sheet, or a plated steel sheet. The steel sheet includes, by weight %, C: 0.6% to 1.0%, Si: 0.1% to 2.5%, Mn: 10% to 15%, P: 0.02% or less, S: 0.015% or less, Al: 5% to 8%, Ti: 0.01% to 0.20%, N: 0.02% or less, and the balance of Fe and inevitable impurities, wherein the steel sheet has a specific gravity of 7.4 g/cm$^3$ and a Mn/Al ratio of 2 to 3.

11 Claims, No Drawings

(56) References Cited

U.S. PATENT DOCUMENTS

| | | | | |
|---|---|---|---|---|
| 6,387,192 B1 * | 5/2002 | Frommeyer | ............ | C22C 38/02 |
| | | | | 148/329 |
| 2009/0053556 A1 | 2/2009 | Sohn et al. | | |
| 2009/0165897 A1 | 7/2009 | McEwan | | |
| 2009/0202382 A1 | 8/2009 | Kim et al. | | |
| 2009/0277558 A1 * | 11/2009 | Kikuchi | ................ | B29D 30/48 |
| | | | | 152/540 |
| 2009/0297387 A1 | 12/2009 | Chin et al. | | |

FOREIGN PATENT DOCUMENTS

| | | | |
|---|---|---|---|
| JP | 55145154 A | * | 11/1980 |
| JP | 2005-325388 | | 11/2005 |
| JP | 2005325388 A | * | 11/2005 |
| JP | 2006118000 A | | 5/2006 |
| JP | 2006176843 A | | 7/2006 |
| JP | 2007084882 A | * | 4/2007 |
| JP | 2010209377 A | | 9/2010 |
| KR | 19940002370 A | | 2/1994 |
| KR | 20070067593 A | | 6/2007 |
| KR | 20070067950 A | | 6/2007 |
| KR | 20090070503 A | | 7/2009 |
| KR | 20090123229 A | | 12/2009 |
| WO | 2006082104 A1 | | 8/2006 |

OTHER PUBLICATIONS

D.A. Melford, "The Influence of Residual and Trace Elements on Hot Shortness and High Temperature Embrittlement," Philosophical Transacitons of the Royal Society of London A, 295, 1980, pp. 89-103.*

James F. Shackelford and William Alexander, CRC Materials Science and Engineering Handbook, Third ed., CRC Press, 2001, pp. 58-59 (Table 25).*

\* cited by examiner

AUSTENITIC, LIGHTWEIGHT, HIGH-STRENGTH STEEL SHEET HAVING HIGH YIELD RATIO AND DUCTILITY, AND METHOD FOR PRODUCING THE SAME

TECHNICAL FIELD

The present invention relates to an austenitic, lightweight, high-strength steel sheet having a high yield ratio and ductility and a method for producing the same, and more particularly, to a high-strength steel sheet for automotive interior panels, exterior panels, and structural parts, and a method for producing the steel sheet.

BACKGROUND ART

Recently, demand for high-strength automotive parts has markedly increased to allow for reductions in the weight of automobiles for low exhaust gas emissions and good gas mileage as well as to improve the impact safety of automobiles. To this end, high-ductility, high-strength steel sheets have been developed and commercialized.

However, the weight of automobiles may increase due to more parts being used to improve safety and convenience, while relatively heavy batteries are used in next-generation electric automobiles using electrical energy instead of petroleum. However, there is a limit to decreasing the weight of automobiles through the use of the above-mentioned high-ductility, high-strength steel sheets. Therefore, it is necessary to use lightweight materials such as steel sheets having a low specific gravity to additionally decrease the weight of automobiles. Such steel sheets having low specific gravity have very high degrees of strength and ductility but are relatively inexpensive as compared with a rival material, aluminum (Al), and are thus considered as a substitute that can satisfy market demand.

Advanced high strength steels (AHSS) such as dual phase (DP) steels and transformation induced plasticity (TRIP) steels are currently typical of high-ductility, high-strength steels used for automobiles. However, since strength and ductility are obtained in such steels through including martensite or retained austenite in ferrite, such steels are subject to deformation by the mechanism of dislocation glide and are limited to having good ductility at high strength due to interfaces between different types of microstructure.

A typical technique for another kind of steel is disclosed in Korean Patent Application Laid-open Publication No.: 1994-0002370: high-strength twinning induced plasticity (TWIP) steel including 15% or more of Mn. The TWIP steel has a single-phase austenite microstructure and highly improved strength-ductility characteristics but has low yield strength at a yield ratio of 40% to 60%, and is thus difficult to be provided with sufficient rigidity for automotive structural parts. Furthermore, the addition of a large amount of Mn may increase manufacturing costs and decrease the productivity of production lines.

In addition, high-strength, high-ductility steel sheets having a low specific gravity, owing to the addition of a light element, Al, have been developed. A typical technique therefor is disclosed in European Patent No.: EP0889144. The disclosed technique relates to an austenitic steel sheet formed by adding 8% or less of Al and 10% to 30% of Mn to low carbon steel. Since the disclosed steel sheet has a low carbon content, a large amount of Mn is added to stabilize austenite therein. However, when the disclosed sheet is deformed, austenite may easily be transformed into martensite to thereby decrease ductility.

Japanese Patent Application Laid-open Publication No.: 2006-176843 discloses steel including 0.8% to 1.2% of carbon, 10% to 30% of Mn, and 8% to 12% of Al. Since the content of Mn is low, with respect to the content of Al, large amounts of precipitates such as $(Fe,Mn)_3AlC$ are present, which decreases ductility and facilitates delayed fractures caused by hydrogen absorption after processing.

An aspect of the present invention provides an austenitic, lightweight, high-strength steel sheet including appropriate concentrations of alloying elements such as Mn, Si, and Al to obtain a tensile strength of 800 MPa or greater, an elongation of 30% or greater, and a yield ratio of 60% or greater that are difficult to obtain from high-carbon, high-manganese steel sheets or high-manganese, lightweight steel sheets of the related art.

According to an aspect of the present invention, there is provided an austenitic, lightweight, high-strength steel sheet having a high yield ratio and ductility, the steel sheet including, by weight %, C: 0.6% to 1.0%, Si: 0.1% to 2.5%, Mn: 10% to 15%, P: 0.02% or less, S: 0.015% or less, Al: 5% to 8%, Ti: 0.01% to 0.20%, N: 0.02% or less, and the balance of Fe and inevitable impurities, wherein the steel sheet has a specific gravity of 7.4 $g/cm^3$ and a Mn/Al ratio of 2 to 3.

The steel sheet may be one of a hot-rolled steel sheet, a cold-rolled steel sheet, and a plated steel sheet. The steel sheet may further include at least one selected from the group consisting of Cr: 0.1% to 3.0%, Ni: 0.05% to 2.0%, Cu: 0.1% to 2.0%, and Mo: 0.05% to 0.5%. The steel sheet may further include at least one selected from the group consisting of V: 0.005% to 0.5%, Nb: 0.005% to 0.2%, Zr: 0.005% to 0.2%, and B: 0.0005% to 0.0030%. The steel sheet may further include one or two selected from the group consisting of Sb: 0.005% to 0.2% and Ca: 0.001% to 0.02%. The steel sheet may have a single-phase austenite microstructure. The steel sheet may have a tensile strength of 800 MPa to 1200 MPa, a yield ratio of 60% or more, and elongation of 30% or more.

According to another aspect of the present invention, there is provided a method for producing an austenitic, lightweight, high-strength steel sheet having a high yield ratio and ductility, the method including: hot rolling a slab at a hot-rolling start temperature of 1000° C. to 1200° C. and a hot-rolling finish temperature of 850° C. or higher so as to form a steel sheet, wherein the slab includes, by weight %, C: 0.6% to 1.0%, Si: 0.1% to 2.5%, Mn: 10% to 15%, P: 0.02% or less, S: 0.015% or less, Al: 5% to 8%, Ti: 0.01% to 0.20%, N: 0.02% or less, and the balance of Fe and inevitable impurities, and the slab has a specific gravity of 7.4 $g/cm^3$ and a Mn/Al ratio of 2 to 3; and coiling the hot-rolled steel sheet at a temperature of 600° C. or lower.

Prior to the hot rolling of the slab, the method may further include cooling the slab and reheating the slab to a temperature of 1000° C. to 1200° C. After the coiling of the hot-rolled steel sheet, the method may further include: cold rolling the coiled steel sheet at a reduction ratio of 20% to 70%; after heating the cold-rolled steel sheet the cold-rolled steel sheet at a rate of 1° C./s to 50° C./s to a temperature equal to or higher than a recrystallization temperature but not higher than 900° C., annealing the cold rolled steel sheet for 10 seconds to 180 seconds; and cooling the annealed steel sheet at a rate of 1° C./s to 100° C./s. The method may further include plating the steel sheet with at least one selected from the group consisting of Zn, Zn—Fe, Zn—Al, Zn—Mg, Zn—Al—Mg, Al—Si, and Al—Mg—Si at a plating density of 20 $g/m^2$ to 120 $g/m^2$.

The present invention provides a steel sheet having a low specific gravity, a high yield ratio, and high ductility as compared to high-strength steel sheets of the related art such as advanced high strength steels (AHSS). The steel sheet of the present invention is effective in maintaining the rigidity of a structural member and have good press processing characteristics so that the steel sheet can be used for manufacturing automotive parts to reduce the weight of automobiles and combining a plurality of parts into a single module or as one part to simplify machining or assembly processes.

DETAILED DESCRIPTION OF THE INVENTION AND BEST MODE

The present invention is provided to solve the problem that a low-carbon, high-manganese steel of the related art has a low yield ratio (yield strength/tensile strength) of less than 60%. For this, according to the present invention, the yield ratio of steel is controlled as follows: a large amount of Al is added to increase the initial strain resistance of the steel by the radius difference between Fe atoms and Al atoms, and thus, to increase the yield strength of the steel; the concentrations of elements increasing stacking fault energy such as C, Al, and Mn are adjusted to maintain the stacking fault energy of the steel within an appropriate range and to thus decrease the rate of work hardening of the steel; and Al and Si are added to suppress dynamic strain aging (DSA) of the steel and to prevent an increase in tensile strength of the steel. In addition, so as to ensure good ductility as compared to strength, austenite is thermally stabilized by adding C and Mn, and the concentration of Al is appropriately adjusted to suppress the generation of ε-martensite and the precipitation of $(Fe,Mn)_3AlC$. Furthermore, the concentrations of elements such as C, Mn, Al, and Si are adjusted to control stacking fault energy in a manner such that dislocation glide and twin deformation take place together to obtain a desired level of ductility by the effect of twinning induced plasticity (TWIP).

The present invention will now be described in detail.

C: 0.6% to 1.0% (hereinafter, % refers to weight %)

Since C stabilizes austenite while increasing stacking fault energy and inducing dynamic strain aging, if the concentration of C is increased, ductility can be increased even though the yield ratio may be slightly decreased. If the concentration of C is excessively high, $(Fe,Mn)_3AlC$ is generated to cause delayed fractures induced by hydrogen, and the solidifying point of molten steel is lowered to cause low-temperature casting during a continuous casting process and thus to have a bad influence on slab manufacturing equipment. Therefore, it may be preferable that the concentration of C be within the range of 0.6% to 1.0% for stabilizing austenite, guaranteeing tensile strength, and improving ductility.

Si: 0.1% to 2.5%

Like Al, Si decreases the specific gravity of steel and increases the strength and stacking fault energy of steel, but decreases the dynamic strain aging of steel. In addition, since Si affects the high-temperature viscosity of a welding portion when steel is welded, it may be preferable that the ratio of Mn/Si in steel, particularly, in high-manganese steel be set not to exceed 30. If a large amount of Si is added to steel, a relatively thick high-temperature oxide layer may be unevenly formed on the steel to decrease the ductility of the steel. Therefore, it may be preferable that the concentration of Si be set to be within the range of 0.1% to 2.5%.

Mn: 10% to 15%

Mn, together with C, is an element necessary for thermally stabilizing austenite and increasing stacking fault energy. In addition, Mn increases the lattice constant of steel to decrease the density of the steel. That is, Mn decreases the specific gravity of steel. In the present invention, since a large amount of Al is added to steel to increase the yield ratio of the steel, the stacking fault energy of the steel may be excessively increased. Therefore, it may be preferable that the concentration of Mn be set to be within the range of 10% to 15% so as to ensure thermal stability of austenite while reducing stacking fault energy. If the concentration of Mn is set to be within the above-mentioned range, material costs may be reduced when high-manganese steel is manufactured.

P: 0.02% or less

During solidification of a slab, P segregates along columnar or equiaxed grain boundaries to make the slab brittle at high temperatures and at room temperature and may cause cracks in the slab. In addition, after processing, P increases the ductility-brittleness transition temperature of steel, and makes steel sensitive to hydrogen brittleness. Therefore, it may be preferable that the concentration of P be set to be 0.02% or less.

S: 0.015% or less

S causes high-temperature brittleness as P does and forms inclusions such as MnS, thereby causing fractures when a steel sheet is hot-rolled or cold-rolled. Therefore, it may be preferable that the concentration of S be 0.015% or less.

Al: 5% to 8%

Al is an important element together with C and Mn in the steel sheet of the present invention. Since the atomic radius of Al is much different from that of Fe, Al increases the yield strength of steel by increasing the strength of the steel by virtue of atomic friction during initial deformation of the steel, and Al is an element having the most influence on increasing the stacking fault energy of steel. That is, Al is an important element for controlling work hardening behaviors of the steel sheet of the present invention. The addition of a large amount of Al is preferable for decreasing the specific gravity of steel, but the addition of an excessive amount of Al increases intermetallic compounds such as $(Fe,Mn)_3AlC$ to markedly decrease the ductility of steel. Therefore, it may be preferable that the concentration of Al be within the range of 5% to 8%.

Ti: 0.01% to 0.20%

At high temperatures, Ti crystallizes as TiN to suppress the generation of AlN in steel, and at mid range temperatures, Ti forms TiC to increase the yield strength of steel. However, if a large amount of Ti is added, continuous casting nozzles may be clogged or inclusion defects may occur due to excessive crystallization of TiN. Therefore, it may be preferable that the concentration of Ti be within the range of 0.01% to 0.2%.

N: 0.02% or less

A relatively large amount of N is dissolved in austenite steel to stabilize the austenite structure. However, in the present invention, since a large amount of Al is added, N crystallizes as AlN in molten steel to clog continuous casting nozzles or cause inclusion defects, and a large amount of AlN causes cracks in a slab. In addition, if a large amount of N is added to steel, equipment costs increase because a high degree of pressure must be applied when melting the steel, and precipitation of AlN decreases the ductility of the steel. Therefore, it may be preferable that the concentration of N be 0.02% or less.

Although steel has the above-described composition, it is important to appropriately adjust the concentrations of C, Mn, and Al relative to each other so as to guarantee a high yield ratio and degree of ductility. Although the addition of a large amount of Al is advantageous in terms of a high yield ratio and low specific gravity, if the ratio of Mn/Al is low, ferrite may be present or deformation may occur in the form of dislocation glide rather than twin deformation, and along with this, a large amount of $(Fe,Mn)_3AlC$ may be generated to markedly reduce ductility. Therefore, the ratio of Mn/Al may be adjusted to be 2 or greater, preferably, between 2 and 3. Particularly, if both the concentration of Al and the ratio of Mn/Al are high, additional ductility improvement may be attained by microband induced plasticity (MBIP). Since lightweight steel sheets of the related art have a Mn/Al ratio within the range of 0.7 to 2.9 and an excessive concentration of Al greater than the concentration of Al in the steel sheet of the present invention by 8% or more, $(Fe,Mn)_3AlC$ is generated to increase the fraction of a second phase and strength of the steel sheets, thereby increasing cold rolling loads and making the steel sheets brittle during cold rolling.

The basic composition of steel of the present invention has been described. In addition, to adjust the strength, ductility, and other properties of steel, one or more of the following elements may be added: Cr: 0.1% to 3.0%, Ni: 0.05% to 2.0%, Cu: 0.1% to 2.0%, Mo: 0.05% to 0.5%, V: 0.005% to 0.5%, Nb: 0.005% to 0.2%, Zr: 0.005% to 0.2%, B: 0.0005% to 0.0030%, Sb: 0.005% to 0.2%, and Ca: 0.001% to 0.02%.

Cr: 0.1% to 3.0%

Cr, having a function of reducing stacking fault energy, may be added to high-Al steel of the present invention to adjust stacking fault energy. In addition, since Cr improves the corrosion resistance of steel, Cr suppresses absorption of hydrogen when steel corrodes. However, if the concentration of Cr is excessive, Cr carbide may be formed to reduce the ductility of steel. Therefore, it may be preferable that the concentration of Cr be within the range of 0.1% to 3.0%.

Ni: 0.05% to 2.0%

Ni is an element suitable for the purpose of the present invention because Ni stabilizes austenite and increases stacking fault energy. However, since Ni is relatively expensive, C and Mn are used in the present invention instead of Ni. In addition, since Ni added to steel concentrates on the surface of the steel to improve the corrosion and oxidation resistance of the steel, Ni reduces scale or scale defects during a hot rolling process, improves adhesion of plating, and suppresses absorption of hydrogen during corrosion. Therefore, it may be preferable that the concentration of Ni be within the range of 0.05% to 2.0%.

Cu: 0.1% to 2.0%

Like Ni, Cu stabilizes austenite and increases stacking fault energy. Cu is inexpensive as compared to Ni. Therefore, Cu is suitable for the purposes of the present invention. However, if the concentration of Cu is excessively high, Cu exists as liquid on grain boundaries at a high temperature to cause boundary brittleness and saw-tooth defects on a rolled steel sheet. Therefore, it may be preferable that the concentration of Cu be within the range of 0.1% to 2.0%.

Mo: 0.05% to 0.5%

Like Cr, No is an element forming ferrite. In addition, No has an influence on thermal stability of austenite and forms micro carbides to increase the strength of steel. However, No is expensive, and a high concentration of No decreases the ductility of steel. Therefore, it may be preferable that the concentration of Mo be within the range of 0.05% to 0.5%.

V: 0.005% to 0.5%

V is an element effective in increasing the strength of steel by forming carbonitrides in the steel. However, during solidification, V precipitates on grain boundaries to cause cracks in a slab, and during a hot rolling process, V markedly delays solid solution strengthening and recrystallization to increase rolling loads. Therefore, it may be preferable that the concentration of V be within the range of 0.005% to 0.5%.

Nb: 0.005% to 0.2%

Like V, Nb is an element very effective for forming carbonitrides and delaying recrystallization, Nb may be added to steel to increase the strength of the steel. For these effects, it may be preferable that the concentration of Nb be within the range of 0.005% to 2.0%.

Zr: 0.005% to 0.2%

Like Ti, Zr is effective to previously remove N from steel to suppress the formation of AlN. However, Zr is relatively expensive. Therefore, it may be preferable that the concentration of Zr be within the range of 0.005% to 0.2%.

B: 0.0005% to 0.0030%

In steel, B segregates on grain boundaries better than P, and thus problems related to the segregation of P can be reduced. However, if the concentration of B in steel is excessive, boron oxide concentrates on the surface of the steel to decreases wetting of zinc plating, or boron carbide is formed to reduce the ductility of the steel. Therefore, it may be preferable that the concentration of B be within the range of 0.0005% to 0.003%.

Sb: 0.005% to 0.2%

Sb may be another characteristic element in the present invention. Since Sb segregates on grain boundaries to reduce grain boundary energy and suppresses the generation of $(Fe,Mn)_3AlC$ and diffusion of C or Al along grain boundaries, Sb can reduce removal of surface ingredients in steel caused by oxidation and thus stabilize the surface structure of steel. However, if the concentration of Sb in steel is excessive, the ductility of steel decreases. Therefore, it may be preferable that the concentration of Sb be within the range of 0.005% to 0.2%.

Ca: 0.001% to 0.02%

Ca is usually added to steel to remove S. Ca forms coarse sulfides such as CaS to improve hot rolling properties of steel. However, if a large amount of Ca is added to steel as a volatile element, addition of alloy iron may increase and the concentration of Ca in the steel may become excessive to reduce the toughness of the steel. Therefore, it may be preferable that the concentration of Ca be within the range of 0.001% to 0.02%.

Hereinafter, a method for producing a steel sheet will be described according to the present invention.

A slab having the above-described composition and concentrations is hot-rolled at a hot-rolling start temperature of 1000° C. to 1200° C. and a hot-rolling finish temperature of 850° C. or higher so as to form a hot-rolled steel sheet. At this time, the hot rolling may be performed on the slab just after the slab is formed or after the slab is cooled and then reheated to 1000° C. to 1200° C. If the hot-rolling start temperature is outside of this range, the slab may easily crack during the hot rolling. If the reheating temperature exceeds 1200° C., a low-melting-point compound may be formed on grain boundaries to cause cracks and scrap defects on the hot-rolled steel sheet. The hot rolling may be finished at a low temperature to reduce the grain size of the steel sheet. However, if the hot-rolling finish temperature is lower than 850° C., resistance increases against hot-rolling deformation, and thus it is difficult to make the steel sheet thin. In addition, the ductility of the steel sheet may be decreased due to precipitation of $(Fe,Mn)_3AlC$.

Thereafter, the hot-rolled steel sheet is coiled at a temperature of 600° C. or lower. If the coiling temperature exceeds 600° C., $(Fe,Mn)_3AlC$ may be excessively formed to markedly decrease the ductility of the steel sheet, and the ductility of the steel sheet may not be restored in the next cold rolling process. The hot-rolled steel sheet can have improved properties such as a specific gravity of 7.4 $g/cm^3$, a tensile strength of 800 MPa to 1200 MPa, a yield ratio of 60% or greater, and elongation of 30%.

The coiled steel sheet is pickled and cold-rolled. It may be preferable that the coiled steel sheet be cold-rolled at a reduction ratio of 20% to 70%. The reduction ratio of the cold rolling is set to be 20% or greater so as to accumulate cold-rolling energy in the steel sheet and obtain a recrystallized microstructure in the following annealing process. If the reduction ratio of the cold rolling is less than 20%, the ductility of the cold-rolled steel sheet may be lower than that of an annealed steel sheet. If the reduction ratio of the cold rolling is greater than 70%, work hardening may proceed rapidly to excessively increase the load of cold rolling and decrease the productivity of cold rolling equipment.

Thereafter, for recrystallization of the cold-rolled steel sheet, the cold-rolled steel sheet is heated at a rate of 1° C./s to 50° C./s to a temperature equal to or higher than a recrystallization temperature but not higher than 900° C., and then the cold-rolled steel sheet is annealed for 10 seconds to 180 seconds. If the heating rate is lower than 1° C./s, large amounts of elements such as Mn, Si, and Al may concentrate on the surface of the steel sheet in the form of oxides to cause surface defects and contaminate annealing equipment. If the heating rate is greater than 50° C./s, the recrystallization temperature may become excessively high, and manufacturing costs may be increased because of a requirement for additional rapid heating equipment. The annealing is performed at a temperature between the recrystallization temperature and 900° C. for 10 seconds to 180 seconds. If the annealing is performed at a temperature lower than the recrystallization temperature or for less than 10 seconds, the work-hardened structure of the steel sheet may not be recovered, and thus it may be difficult to obtain a desired level of ductility. If the annealing is performed at a temperature higher than 900° C. or for longer than 180 seconds, grains of the steel sheet may be coarsened to lower strength, and more oxides may be formed on the surface of the steel sheet. The recrystallization of the steel sheet of the present invention is within the range of 600° C. to 650° C.

After the annealing, the steel sheet is cooled at a cooling rate of 1° C./s to 100° C./s. If the cooling rate is lower than the range, $(Fe,Mn)_3AlC$ may precipitate to reduce the ductility of the steel sheet. If the cooling rate is higher than the range, the shape of the steel sheet may be deteriorated, and it may be difficult to finish the cooling process at a predetermined temperature, for example, at a temperature of 400° C. to 500° C. for the next hot-dip coating process. After the annealing, the cold-rolled steel sheet has a grain size smaller than that of a hot-rolled steel sheet.

To improve the corrosion resistance of the cold-rolled steel sheet, the cold-rolled steel sheet may be plated with at least one selected from the group consisting of Zn, Zn—Fe, Zn—Al, Zn—Mg, Zn—Al—Mg, Al—Si, and Al—Mg—Si at a plating density of 20 $g/m^2$ to 120 $g/m^2$. If the plating density is less than 20 $g/m^2$, the plating of the steel sheet may be destroyed in corrosive environments. That is, corrosion resistance may be insufficient. If the plating density is greater than 120 $g/m^2$, manufacturing costs increase due to excessive plating.

MODE FOR INVENTION

The present invention will now be described in more detail. The example is an exemplary example which is intended to explain the present invention, and the present invention is not limited to the example.

(Embodiment)

Steel sheets were fabricated under the conditions shown in Table 2 by using ingots having compositions shown in Table 1. In the fabrication, the start temperature of hot rolling was 1150° C., the heating rate during a cold rolling process was 5° C./s, and the annealing period was 45 seconds. Then, properties and microstructures of hot-rolled steel sheets and cold-rolled steel sheets were measured as shown in Table 3.

TABLE 1

| No. | C | Si | Mn | P | S | Al | Ti | N | Others | Mn/Al | Mn/Si |
|---|---|---|---|---|---|---|---|---|---|---|---|
| *IS1 | 0.97 | 0.60 | 14.0 | 0.011 | 0.0020 | 5.7 | 0.11 | 0.0031 | — | 2.5 | 23 |
| IS2 | 0.98 | 0.65 | 14.8 | 0.011 | 0.0015 | 6.2 | 0.10 | 0.0011 | — | 2.4 | 23 |
| IS3 | 0.95 | 0.45 | 12.2 | 0.011 | 0.0039 | 5.2 | 0.10 | 0.0053 | — | 2.3 | 27 |
| IS4 | 0.82 | 0.46 | 12.5 | 0.011 | 0.0005 | 5.3 | 0.10 | 0.0034 | — | 2.4 | 27 |
| IS5 | 0.67 | 0.45 | 12.3 | 0.011 | 0.0011 | 5.6 | 0.11 | 0.0083 | — | 2.2 | 27 |
| IS6 | 0.80 | 0.65 | 14.7 | 0.011 | 0.0005 | 5.5 | 0.10 | 0.0015 | 0.51Cr—0.32Ni—0.0025B | 2.7 | 23 |
| IS7 | 0.82 | 0.64 | 14.5 | 0.011 | 0.0020 | 5.5 | 0.10 | 0.0031 | 0.50Cr—0.25Ni—0.05Nb—0.1Mo | 2.6 | 23 |
| IS8 | 0.81 | 0.65 | 14.5 | 0.011 | 0.0039 | 5.5 | 0.10 | 0.0040 | 0.5Cr—1.0Cu—0.05Zr—0.005Ca | 2.6 | 22 |

TABLE 1-continued

| No. | C | Si | Mn | P | S | Al | Ti | N | Others | Mn/Al | Mn/Si |
|---|---|---|---|---|---|---|---|---|---|---|---|
| IS9 | 0.80 | 0.65 | 14.6 | 0.012 | 0.0040 | 5.6 | 0.11 | 0.0030 | 0.2V—0.03Sb | 2.6 | 22 |
| **CS1 | <u>1.18</u> | 0.50 | 12.5 | 0.011 | 0.0005 | 5.5 | 0.10 | 0.0031 | — | 2.3 | 25 |
| CS2 | 0.69 | 0.51 | <u>8.7</u> | 0.011 | 0.0005 | 6.8 | 0.10 | 0.0019 | — | 1.3 | 17 |
| CS3 | 0.73 | 0.51 | 12.6 | 0.011 | 0.0005 | <u>8.9</u> | 0.11 | 0.0013 | — | 1.4 | 25 |
| CS4 | 0.75 | 0.50 | 12.5 | 0.011 | 0.0005 | <u>2.1</u> | 0.11 | 0.0011 | — | 6.0 | 25 |
| CS5 | <u>0.43</u> | 0.51 | 12.5 | 0.011 | 0.0005 | 7.5 | 0.10 | 0.0017 | — | 1.7 | 25 |

*IS: Inventive Steel,
**CS: Comparative Steel

TABLE 2

| No. | | Reheating Temp. (° C.) | Rolling Finish Temp. (° C.) | Coiling Temp. (° C.) | Cold rolling reduction ratio (%) | Annealing Temp. (° C.) | Cooling rate (° C./s) |
|---|---|---|---|---|---|---|---|
| Steel | Specimen | | | | | | |
| *IS1 | **ISP1 | 1150 | 900 | 450 | 50 | 800 | 20 |
| IS2 | ISP2 | 1150 | 900 | 450 | 50 | 800 | 20 |
| IS3 | ISP3 | 1150 | 900 | 450 | 50 | 800 | 20 |
| IS4 | ISP4 | 1150 | 900 | 450 | 50 | 800 | 20 |
| | ***CSP1 | 1150 | <u>750</u> | 450 | 50 | 800 | 20 |
| | CSP2 | 1150 | 900 | <u>700</u> | 50 | 800 | 20 |
| | CSP3 | 1150 | 900 | 450 | <u>10</u> | 800 | 20 |
| | CSP4 | 1150 | 900 | 450 | 33 | <u>500</u> | 20 |
| | CSP5 | 1150 | 900 | 450 | 33 | <u>950</u> | 20 |
| | CSP6 | 1150 | 900 | 450 | 33 | 800 | <u>0.1</u> |
| IS5 | ISP5 | 1150 | 900 | 450 | 33 | 800 | 20 |
| IS6 | ISP6 | 1150 | 900 | 450 | 50 | 800 | 20 |
| IS7 | ISP7 | 1150 | 900 | 450 | 50 | 800 | 20 |
| IS8 | ISP8 | 1150 | 900 | 450 | 50 | 800 | 20 |
| IS9 | ISP9 | 1150 | 900 | 450 | 50 | 800 | 20 |
| ****CS1 | CSP7 | 1150 | 900 | 450 | 50 | 800 | 20 |
| CS2 | CSP8 | 1150 | 900 | 450 | 50 | 800 | 20 |
| CS3 | CSP9 | 1150 | 900 | 450 | 50 | 800 | 20 |
| CS4 | CSP10 | 1150 | 900 | 450 | 50 | 800 | 20 |
| CS5 | CSP11 | 1150 | 900 | 450 | 50 | 800 | 20 |

*IS: Inventive Steel,
**ISP: Inventive Specimen,
***CSP: Comparative Specimen,
****CS: Comparative Steel

TABLE 3

| No. | | Specific gravity (g/cm³) | Micro-structure | Hot-rolled steel sheet | | | | Cold-rolled steel sheet | | | |
|---|---|---|---|---|---|---|---|---|---|---|---|
| | | | | YS (MPa) | TS (MPa) | El (%) | YR (YS/TS) | YS (MPa) | TS (MPa) | El (%) | YR (YS/TS) |
| Steel | Specimen | | | | | | | | | | |
| *IS1 | **ISP1 | 7.32 | γ | 731 | 1014 | 44.5 | 72 | 645 | 1030 | 48.1 | 63 |
| IS2 | ISP2 | 7.29 | γ | 921 | 1118 | 42.3 | 82 | 852 | 1063 | 45.4 | 80 |
| IS3 | ISP3 | 7.34 | γ | 950 | 1087 | 41.8 | 87 | 889 | 1098 | 43.5 | 81 |
| IS4 | ISP4 | 7.34 | γ | 889 | 1025 | 38.9 | 87 | 837 | 1055 | 41.0 | 79 |
| | ***CSP1 | | γ + θ | 815 | 1004 | <u>24</u> | 81 | 765 | 980 | <u>28.3</u> | 78 |
| | CSP2 | | γ + θ | 725 | 911 | <u>22.3</u> | 80 | 734 | 945 | <u>27.5</u> | 78 |
| | CSP3 | | γ | — | — | — | — | 853 | 1025 | <u>28.5</u> | 83 |
| | CSP4 | | γ | — | — | — | — | 1094 | 1242 | <u>23.9</u> | 88 |
| | CSP5 | | γ | — | — | — | — | 550 | 981 | 47.2 | <u>56</u> |
| | CSP6 | | γ + θ | — | — | — | — | 655 | 980 | <u>26.4</u> | 67 |
| IS5 | ISP5 | 7.32 | γ | 861 | 990 | 34.2 | 87 | 836 | 1009 | 36.5 | 83 |
| IS6 | ISP6 | 7.33 | γ | 741 | 1022 | 40.5 | 73 | 727 | 1051 | 42.9 | 69 |
| IS7 | ISP7 | 7.33 | γ | 835 | 1099 | 37.5 | 76 | 787 | 1130 | 42.5 | 70 |

TABLE 3-continued

| Steel | No. Specimen | Specific gravity (g/cm³) | Micro-structure | Hot-rolled steel sheet | | | | Cold-rolled steel sheet | | | |
|---|---|---|---|---|---|---|---|---|---|---|---|
| | | | | YS (MPa) | TS (MPa) | El (%) | YR (YS/TS) | YS (MPa) | TS (MPa) | El (%) | YR (YS/TS) |
| IS8 | ISP8 | 7.33 | γ | 710 | 981 | 41.1 | 72 | 688 | 1022 | 44.0 | 67 |
| IS9 | ISP9 | 7.32 | γ | 855 | 1092 | 35.6 | 78 | 805 | 1108 | 39.1 | 73 |
| ****CS1 | CSP7 | 7.33 | γ | 1094 | 1242 | 23.9 | 88 | 976 | 1129 | 20.6 | 86 |
| CS2 | CSP8 | 7.26 | γ + α | 427 | 1025 | 12.7 | 42 | 562 | 1245 | 14.5 | 45 |
| CS3 | CSP9 | 7.16 | γ + α | 889 | 1025 | 17.1 | 87 | 937 | 1104 | 20.1 | 85 |
| CS4 | CSP10 | 7.50 | γ | 475 | 965 | 52.0 | 49 | 442 | 981 | 55.3 | 45 |
| CS5 | CSP11 | 7.23 | γ | 848 | 976 | 17.6 | 87 | 806 | 954 | 22.2 | 84 |

γ: austenite,
α: ferrite,
θ: cementite
*IS: Inventive Steel,
**ISP: Inventive Specimen,
***CSP: Comparative Specimen,
****CS: Comparative Steel As shown in Tables 1 to 3, Inventive Samples 1 to 9, prepared according to compositions and manufacturing conditions proposed by the present invention, have yield ratios within the range of 72% to 87% after hot rolling and within the range of 67% to 83% after cold rolling, and elongation within the range of 34% to 44% after hot rolling and within the range of 36% to 48% after cold rolling. In addition, Inventive Samples 1 to 9 have a single-phase austenite microstructure, and a specific gravity of 7.4 g/cm³ or less owing to the addition of 5% or more of Al. Furthermore, Mn/Al ratios thereof are within the range from 2 to 3, and Mn/Si ratios thereof relating to flash welding properties are preferable within a range equal to or less than 30.

However, Comparative Samples 1 and 2, having compositions according to the present invention but a rolling finish temperature or coiling temperature outside of the range proposed by the present invention, are low in elongation as compared to Inventive Sample 4 and have a microstructure in which austenite and cementite coexist.

Comparative Samples 3 to 6, having the same hot rolling conditions as Inventive Sample 4 but a cold rolling reduction ratio, annealing temperature, or cooling rate outside of the range proposed by the present invention, are low in elongation and yield ratio. Comparative Samples 7 to 11, prepared according to the manufacturing conditions proposed by the present invention but having compositions not satisfying the present invention, are low in elongation or yield ratio.

The invention claimed is:

1. An austenitic, lightweight, high-strength steel sheet having a high yield ratio and ductility, the steel sheet comprising, by weight %, C: 0.6% to 1.0%, Si: 0.1% to 2.5%, Mn: 10% to 14.8%, P: 0.02% or less, S: 0.015% or less, Al: 5% to 8%, Ti: 0.01% to 0.20%, N: 0.02% or less, Ca: 0.001% to 0.02%, and the balance of Fe and inevitable impurities, wherein the steel sheet has a specific gravity of 7.4 g/cm³, a Mn/Al ratio of 2 to 3, and a single-phase austenite microstructure, and wherein the steel sheet has a yield ratio of 60% or more.

2. The steel sheet of claim 1, wherein the steel sheet is one of a hot-rolled steel sheet, a cold-rolled steel sheet, and a plated steel sheet.

3. The steel sheet of claim 2, further comprising at least one selected from the group consisting of Cr: 0.1% to 3.0%, Ni: 0.05% to 2.0%, Cu: 0.1% to 2.0%, and Mo: 0.05% to 0.5%.

4. The steel sheet of claim 2, further comprising at least one selected from the group consisting of V: 0.005% to 0.5%, Nb: 0.005% to 0.2%, Zr: 0.005% to 0.2%, and B: 0.0005% to 0.0030%.

5. The steel sheet of claim 2, further comprising Sb: 0.005% to 0.2%.

6. The steel sheet of claim 2, wherein the steel sheet has a tensile strength of 800 MPa to 1200 MPa and elongation of 30% or more.

7. The steel sheet of claim 4, further comprising Sb: 0.005% to 0.2%.

8. The steel sheet of claim 3, further comprising Sb: 0.005% to 0.2%.

9. The steel sheet of claim 3, further comprising at least one selected from the group consisting of V: 0.005% to 0.5%, Nb: 0.005% to 0.2%, Zr: 0.005% to 0.2%, and B: 0.0005% to 0.0030%.

10. The steel sheet of claim 9, further comprising Sb: 0.005% to 0.2%.

11. The steel sheet of claim 1, wherein the steel sheet has a tensile strength of 800 MPa to 1200 MPa and elongation of 30% or more.

* * * * *